(12) United States Patent
Howard et al.

(10) Patent No.: US 10,330,301 B1
(45) Date of Patent: Jun. 25, 2019

(54) RECEPTACLE CONNECTOR FOR A LIGHT SENSOR ASSEMBLY FOR A LIGHT FIXTURE

(71) Applicant: TE CONNECTIVITY CORPORATION, Berwyn, PA (US)

(72) Inventors: Edward John Howard, Millersburg, PA (US); Christopher George Daily, Harrisburg, PA (US); Matthew Edward Mostoller, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/955,001

(22) Filed: Apr. 17, 2018

(51) Int. Cl.
| | | |
|---|---|---|
| *F21V 23/04* | (2006.01) | |
| *F21V 17/16* | (2006.01) | |
| *F21V 17/18* | (2006.01) | |
| *H01R 13/625* | (2006.01) | |
| *H01R 13/24* | (2006.01) | |
| *H01R 33/90* | (2006.01) | |
| *F21W 131/10* | (2006.01) | |
| *F21W 131/103* | (2006.01) | |

(52) U.S. Cl.
CPC ........ *F21V 23/0464* (2013.01); *F21V 17/162* (2013.01); *F21V 17/18* (2013.01); *H01R 13/245* (2013.01); *H01R 13/625* (2013.01); *H01R 33/90* (2013.01); *F21W 2131/10* (2013.01); *F21W 2131/103* (2013.01)

(58) Field of Classification Search
CPC ..... F21V 23/0464; H01R 13/62; G01J 1/0266
USPC .................................................. 439/311, 329
See application file for complete search history.

(56) References Cited

U.S. PATENT DOCUMENTS

| | | | | | |
|---|---|---|---|---|---|
| 3,083,347 | A * | 3/1963 | Fahey, Jr. | ............ | H01R 24/005 439/337 |
| 3,123,423 | A * | 3/1964 | Schmitt | ................ | H01R 24/005 439/674 |
| 3,710,130 | A * | 1/1973 | Pate | ........................ | F21V 23/00 250/239 |
| 4,477,143 | A * | 10/1984 | Taylor | .................. | H01R 33/945 439/559 |
| 5,593,318 | A * | 1/1997 | Bilson | ..................... | F21V 23/00 439/364 |
| 7,637,766 | B2 * | 12/2009 | Kauffman | ................. | G01J 1/02 439/337 |

(Continued)

FOREIGN PATENT DOCUMENTS

CN 203277878 U * 11/2013 ............. H01R 13/73

*Primary Examiner* — Tulsidas C Patel
*Assistant Examiner* — Peter G Leigh (57) ABSTRACT

A light sensor assembly includes a receptacle connector configured to be mounted to a light fixture and configured to receive a sensor connector having a photocontrol component including a housing, a spring element and a housing retainer. The housing has a base extending through a fixture housing. The housing has locating features configured to engage a locating feature of the fixture to hold a rotational position of the housing. The housing retainer is positionable on the interior of the fixture housing on the base engaging the spring element. The housing is rotatably positionable on the fixture by lifting upward on the housing to compress the spring element to disengage the locating features of the housing from the locating feature of the fixture and rotating the housing to a new position.

20 Claims, 6 Drawing Sheets

(56) References Cited

U.S. PATENT DOCUMENTS

| | | | |
|---|---|---|---|
| 8,038,481 B1 * | 10/2011 | Creighton | H01R 33/9456 |
| | | | 439/660 |
| 8,348,478 B2 * | 1/2013 | Pelton | F21V 14/04 |
| | | | 362/373 |
| 8,398,435 B2 * | 3/2013 | Aurongzeb | H01R 13/625 |
| | | | 439/607.41 |
| 9,077,112 B2 * | 7/2015 | Mitchell | H01R 13/6397 |
| 9,347,822 B2 * | 5/2016 | Mostoller | H05B 37/0218 |
| 9,638,405 B2 * | 5/2017 | Hobson | F21V 23/0464 |
| 9,691,582 B2 | 6/2017 | Ye | |
| 2013/0044444 A1 * | 2/2013 | Creighton | G01J 1/0271 |
| | | | 361/752 |
| 2016/0111813 A1 * | 4/2016 | Ye | H01J 9/00 |
| | | | 439/384 |
| 2016/0312984 A1 * | 10/2016 | Poorter | F21V 19/0055 |

* cited by examiner

RECEPTACLE CONNECTOR FOR A LIGHT SENSOR ASSEMBLY FOR A LIGHT FIXTURE

BACKGROUND OF THE INVENTION

The subject matter herein relates generally to receptacle connectors for light sensor assemblies of light fixtures.

On street lights and parking lot lights, photocells and the corresponding mating receptacles are typically used to turn the lights on and off based upon the ambient light from the sun. To ensure optimum photocell efficiency, it is important that the photocell light sensor points generally in the north direction. For conventional light sensor assemblies, aiming of the photocell is accomplished by drilling holes in the light fixture in proper positions, which is difficult and time consuming. Some light sensor assemblies have special mounting clips that allow orienting of the receptacle, however such mounting clips are difficult to install and manipulate. Also, such mounting clips tend to fail over time allowing the photocell to migrate and move out of true position over time.

A need remains for a light sensor assembly that allows aiming of the photocell with ease of field use and assembly.

BRIEF DESCRIPTION OF THE INVENTION

In one embodiment, a light sensor assembly is provided including a receptacle connector configured to be mounted to a light fixture and configured to receive a sensor connector having a photocontrol component. The receptacle connector includes a housing having a top and a bottom. The top defines a mating interface configured to be mated to the sensor connector. The housing has contact channels receiving contacts. The housing has a base at the bottom configured to extend through a fixture housing of the light fixture such that the top is accessible at an exterior of the fixture housing and the bottom is accessible at an interior of the fixture housing. The base has a retention feature. The housing has locating features configured to engage a locating feature of the fixture to hold a rotational position of the housing relative to the fixture. The receptacle connector includes a spring element having an opening receiving the base of the housing and positionable on the interior of the fixture housing. The spring element has a spring finger configured to engage the fixture housing. The receptacle connector includes a housing retainer coupled to the base and positionable on the interior of the fixture housing. The housing retainer has a retention feature engaging the retention feature of the housing to secure the housing retainer to the housing, the housing retainer engaging the spring element. The housing is rotatably positionable on the fixture by lifting upward on the housing and the housing retainer to compress the spring element to disengage the locating features of the housing from the locating feature of the fixture and rotating the housing to a new position. The housing is released at the new position and forced downward by the spring finger to engage a corresponding locating feature of the housing with the locating feature of the fixture to again hold the rotational position of the housing relative to the fixture.

In another embodiment, a light sensor assembly is provided including a receptacle connector configured to be mounted to a light fixture and configured to receive a sensor connector having a photocontrol component. The receptacle connector includes a housing having a top and a bottom with a base at the bottom and a flange at the top extending from the base. The top defines a mating interface configured to be mated to the sensor connector. The housing has arcuate shaped contact channels receiving twist lock power contacts open at the top for twist lock mating with twist lock power contacts of the sensor connector. The base is configured to extend through a fixture housing of the light fixture such that a foot of the flange is able to rest on an exterior of the fixture housing and the bottom is accessible at an interior of the fixture housing. The base has a retention feature. The flange has locating features incrementally positioned circumferentially around the foot of the flange configured to engage a locating feature of the fixture to hold a rotational position of the housing relative to the fixture. The receptacle connector includes a spring element having an opening receiving the base of the housing and positionable on the interior of the fixture housing. The spring element has a spring finger configured to engage the fixture housing. The receptacle connector includes a housing retainer coupled to the base and positionable on the interior of the fixture housing. The housing retainer has a retention feature engaging the retention feature of the housing to secure the housing retainer to the housing. The housing retainer engages the spring element. The housing is rotatably positionable on the fixture by lifting upward on the housing and the housing retainer to compress the spring element to disengage the locating features of the housing from the locating feature of the fixture and rotating the housing to a new position. The housing is released at the new position and forced downward by the spring finger to engage a corresponding locating feature of the housing with the locating feature of the fixture to again hold the rotational position of the housing relative to the fixture.

In a further embodiment, a light sensor assembly is provided including a receptacle connector configured to be mounted to a light fixture and configured to receive a sensor connector having a photocontrol component. The receptacle connector includes a housing having a top and a bottom with a base at the bottom and a flange at the top extending from the base. The top defines a mating interface configured to be mated to the sensor connector. The housing has contact channels receiving power contacts. The base is configured to extend through a fixture housing of the light fixture such that a foot of the flange is able to rest on an exterior of the fixture housing and the bottom is accessible at an interior of the fixture housing. The base has a retention feature. The flange has locating features incrementally positioned circumferentially around the foot of the flange configured to engage a locating feature of the fixture to hold a rotational position of the housing relative to the fixture. The receptacle connector includes a spring element including a ring having an upper surface and a lower surface. The ring has an opening through the ring. The opening receives the base of the housing. The ring is positionable on the interior of the fixture housing with the upper surface facing the fixture housing. The spring element has a spring finger extending upward from the ring to engage the fixture housing and hold the ring spaced apart from the fixture housing. The receptacle connector includes a housing retainer coupled to the base and positionable on the interior of the fixture housing. The housing retainer has a cylindrical body having an opening receiving the base of the housing. The body of the housing retainer has an upper lip engaging the lower surface of the ring of the spring element. The housing retainer has a retention feature engaging the retention feature of the housing to secure the housing retainer to the housing. The housing is rotatably positionable on the fixture by lifting upward on the flange of the housing to compress the spring element between the fixture housing and the housing retainer to clear the locating features of the housing above the locating feature of the fixture and rotating the housing to a new position. The housing is released at the new position and forced downward by the spring finger to engage a corresponding locating feature of the housing with the locating feature of the fixture to again hold the rotational position of the housing relative to the fixture.

DETAILED DESCRIPTION OF THE INVENTION

Figure 1:
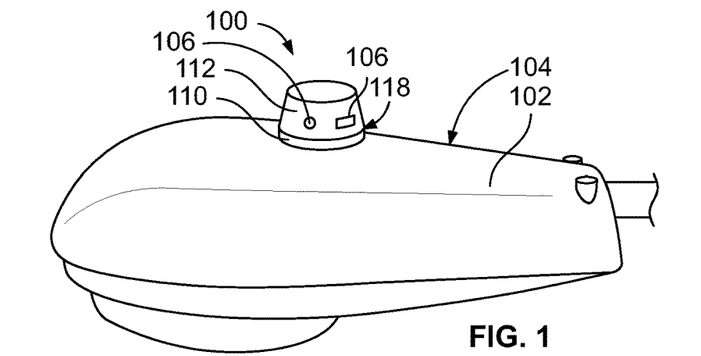
FIG. 1 illustrates a light sensor assembly in accordance with an exemplary embodiment.

FIG. 1 illustrates a light sensor assembly 100 formed in accordance with an exemplary embodiment. The light sensor assembly 100 is mounted to a fixture housing 102 of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or sensor components 106 that may be used for environmental monitoring or to control the light fixture 104, such as for turning the light fixture on or off depending upon light levels, for dimming control of the light fixture, or for controlling other functions. The sensor components 106 may be used for other functions other than controlling the light fixture 104, such as remote monitoring of the environmental surroundings of the fixture housing 102, such as for parking monitoring, for street flow activity monitoring, or other functions. The sensor components 106 may be a photocell or light sensor used to detect ambient light from the sun. Other types of sensor components 106 such as object identification sensors, motion sensors, timing sensors or other types of environmental sensors may be included in the light sensor assembly 100.

The light sensor assembly 100 includes a receptacle connector 110 that forms the bottom of the assembly 100. The receptacle connector 110 may be directly mounted to the fixture housing 102 of the light fixture 104. The light sensor assembly 100 includes a sensor connector 112 coupled to the receptacle connector 110. The sensor connector 112 houses or surrounds the sensor component 106, such as to provide environmental protection for the sensor component 106. In an exemplary embodiment, the receptacle connector 110 is a twist-lock photocontrol receptacle connector and the sensor connector 112 is a twist-lock photocontrol sensor connector, such as connectors being ANSI C136.x compliant. The connectors 110, 112 include contacts 114, 116 (shown in FIG. 2), respectively, at a mating interface 118. For example, the contacts 114, 116 may be twist-lock contacts. The contacts 114, 116 may be high voltage power contacts. Other types of contacts may be provided at the mating interface for a direct, physical electrical connection across the mating interface 118 between the connectors 110, 112. The connectors 110, 112 may be other types of connectors other than twist-lock connectors. The connectors 110, 112 may include other types of contacts 114, 116 other than twist-lock contacts or may not include any contacts but rather be contactless connectors.

In an exemplary embodiment, the receptacle connector 110 includes receptacle signal contacts 120 and the sensor connector 112 includes signal contacts 122 for data communication between the receptacle connector 110 and the sensor connector 112. Data may be transmitted from the sensor connector 112 to the receptacle connector 110, or vice versa, across the mating interface 118. For example, control signals may be transmitted from the sensor connector 112 to the receptacle connector 110 for controlling operation of the light fixture 104. The control signals may be based on sensor data gathered by the sensor component 106.

Figure 2:
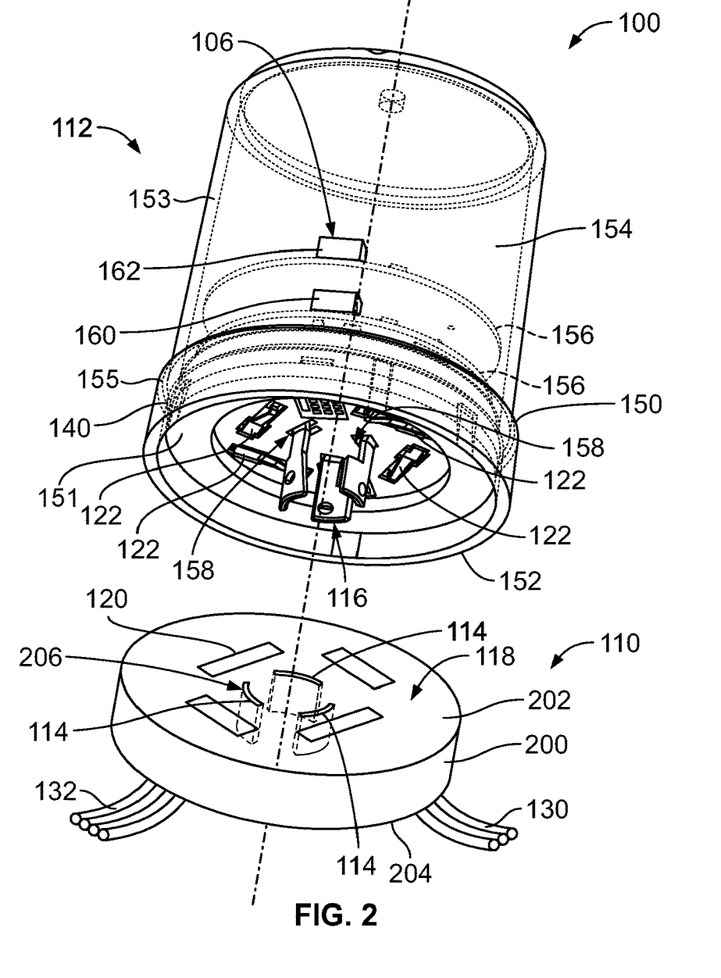
FIG. 2 is a schematic view of the light sensor assembly in accordance with an exemplary embodiment.

FIG. 2 is a schematic view of the light sensor assembly 100 formed in accordance with an exemplary embodiment showing the sensor connector 112 poised for mating with the receptacle connector 110. The connectors 110, 112 hold the power contacts 114, 116 and the signal contacts 120, 122. Optionally, a seal may be provided between the receptacle connector 110 and the sensor connector 112 to seal the light sensor assembly 100 at the mating interface 118 from environmental containments such as water, debris, and the like.

The light sensor assembly 100 may include power wires 130 extending from the receptacle connector 110. The power wires 130 are terminated to corresponding receptacle power contacts 114. The power wires 130 may be power in or power out wires bringing power to the light sensor assembly 100 from a power source or bringing power from the power contacts 114 to another component, such as the light or a driver board for the light of the light fixture 104. In various embodiments, the power wires 130 may include a line wire, a load wire, a neutral wire or other types of wires. In other various embodiments, the light sensor assembly 100 does not include the power wires 130 extending to/from the receptacle connector 110, but rather the power wires 130 may extend to other components in the light fixture 104.

The light sensor assembly 100 may additionally or alternatively include signal wires 132 extending from the receptacle connector 110. The signal wires 132 may be electrically connected to the receptacle signal contacts 120. The signal wires 132 may be electrically connected to other components, such as a control module or driver board of the light fixture 104. The signal wires 132 may transmit data to or from the receptacle connector 110 for data communication with the sensor connector 112. The signal contacts 120, 122 are directly mated together at the mating interface 118.

The receptacle connector 110 includes a housing 200 extending between a top 202 and a bottom 204 opposite the top 202. The housing 200 is configured to be secured to the fixture housing 102. The housing 200 holds the power contacts 114 and the signal contacts 120. Optionally, such components may be entirely contained within the housing 200 and protected from the environment by the housing 200. For example, the power contacts 114 may be held in contact channels 206 within the housing 200. Optionally, the contact channels 206 are arcuate or curved slots or openings in the housing 200 extending between the top 202 and the bottom 204.

In an exemplary embodiment, the receptacle connector 110 is cylindrical shaped, such as to allow easy rotation of the sensor connector 112 relative to the receptacle connector 110 and/or to allow easy rotation of the receptacle connector 110 relative to the fixture housing 102. The receptacle connector 110 may include different sections having different diameters, such as a narrower bottom and a wider top. However, the receptacle connector 110 may have other shapes and alternative embodiments. In an exemplary embodiment, the receptacle connector 110 may be rotatable relative to the fixture housing 102, such as to allow positioning of the receptacle connector 110, and thus the sensor connector 112, relative to the light fixture 104 (e.g., to direct the sensor component 106 in a north direction to receive diffuse ambient light). In an exemplary embodiment, the receptacle connector 110 may be mountable at different, incremental angular positions relative to the fixture housing 102, as described in further detail below.

In an exemplary embodiment, the receptacle connector 110 includes at least one securing feature used to secure the sensor connector 112 relative to the receptacle connector 110. For example, the receptacle connector 110 may include a clip or a flange to secure the sensor connector 112 to the receptacle connector 110. The securing feature may allow rotation of the sensor connector 112 relative to the receptacle connector 110 when engaged. Other fastening methods that secure sensor connector 112 to the receptacle connector 110 may be employed, which may allow rotation of the sensor connector 112 relative to receptacle connector 110. In other various embodiments, the interaction between the power contacts 114, 116 is used to secure the sensor connector 112 to the receptacle connector 110. For example, the power contacts 114, 116 may be twist lock contacts configured to be twist-locked to mate and secure the connectors 110, 112 together.

The sensor connector 112 includes a housing 140 extending between a top 150 and a bottom 152 opposite the top 150. The housing 140 has a base 151 at the bottom 152. The base 151 may define the mating interface and is configured to be secured to the receptacle connector 110. In an exemplary embodiment, the sensor connector 112 includes a sensor lid 154 at the top 150 of the housing 140. The sensor lid 154 may include a dome 153 at the top thereof and a skirt 155 at the bottom thereof circumferentially surrounding the base 151 of the housing 140. In an exemplary embodiment, the second connector 112 is cylindrical shaped, such as to allow easy rotation of the sensor connector 112 relative to the receptacle connector 110, such as during mating. However, the sensor connector 112 may have other shapes and alternative embodiments.

The power contacts 116 and the signal contacts 122 are arranged in the housing 140. For example, the power contacts 116 may be positioned in contact channels 158 in the base 151 of the housing 140. Optionally, the contact channels 158 are arcuate or curved slots or openings in the housing 140. The housing 140 may hold the sensor(s) 106. In an exemplary embodiment, a circuit board 156 is arranged in the housing 140, such as mounted to the base 151 or to the contacts 116, 122 extending above the base 151. Various components may be mounted to the circuit board 156. For example, the power contacts 116 and the signal contacts 122 may be mounted to the circuit board 156. The sensor components 106 may be mounted to the circuit board 156. A control module and/or communication device may be mounted to the circuit board 156.

The power contacts 116 and the signal contacts 122 may extend from the base 151 at the bottom 152 for mating with the receptacle power contacts 114 and the receptacle signal contacts 120, respectively, of the receptacle connector 110 and may be arranged generally around a central axis. However the power contacts 114 and/or the signal contacts 122 may be at different locations in alternative embodiments. Optionally, the power contacts 116 may be twist lock power contacts. For example, the power contacts 116 may be curved and fit in the curved contact channels 206 in the receptacle connector 110 to mate with corresponding curved receptacle power contacts 114. In an exemplary embodiment, the sensor connector 112 may be twisted or rotated to lock the power contacts 116 in the receptacle connector 110, such as in electrical contact with the receptacle power contacts 114. For example, the power contacts 116 may be twist-lock contacts that are initially loaded into the contact channels 206 in a vertical direction and the sensor connector 112 is then rotated, such as approximately 35 degrees, to lock the power contacts 116 in the receptacle connector 110. Other types of mating arrangements between the power contacts 116 and the receptacle connector 110 are possible in alternative embodiments.

In an exemplary embodiment, the sensor connector 112 includes different types of environmental sensor components 106 for sensing different events. For example, the sensor connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board 156 and/or the sensor lid 154. The signal contacts 120 and the photocell 160 may be electrically connected via the circuit board 156. The circuit board 156 may include additional componentry for signal conditioning. For example, the circuit board 156 may have control circuitry for controlling operation of the light fixture 104, such as including a daylight or nighttime control circuit, a timer circuit, a dimming circuit, and the like. Data from the photocell 160 may be transmitted through the signal contacts 120, 122 across the mating interface 118.

In an exemplary embodiment, the sensor connector 112 includes one or more environmental sensors 162 for sensing an environmental characteristic other than ambient light exterior of the sensor connector 112 in the environment exterior of the sensor connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be mounted to the circuit board 156. In an exemplary embodiment, the sensor 162 is electrically connected to the signal contacts 122 via the circuit board 156.

Figure 3:
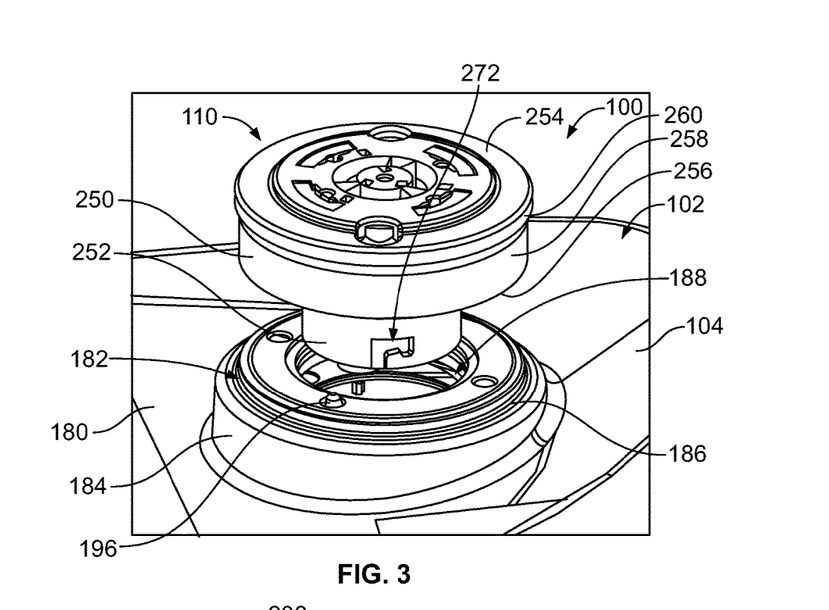
FIG. 3 is a top perspective view of a portion of the light sensor assembly showing a receptacle connector in accordance with an exemplary embodiment.
Figure 4:
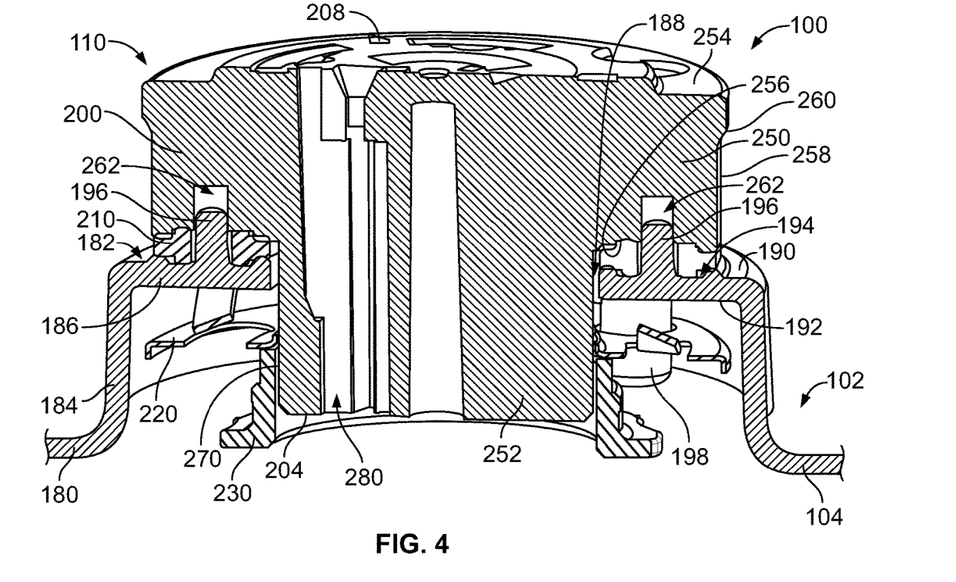
FIG. 4 is a cross-sectional view of a portion of the light sensor assembly showing the receptacle connector.

FIG. 3 is a top perspective view of a portion of the light sensor assembly 100 showing the receptacle connector 110 being coupled to the fixture housing 102. FIG. 4 is a cross-sectional view of a portion of the light sensor assembly 100 showing the receptacle connector 110 coupled to the fixture housing 102. The receptacle connector 110 includes the housing 200, a gasket 210, a spring element 220 and a housing retainer 230.

The housing retainer 230 is configured to be coupled to the bottom 204 of the housing 200. The housing retainer 230 engages the spring element 220 and the spring element 220 is used to hold the housing 200 in sealing engagement against the gasket 210. The gasket 210 is configured to be sealed against the fixture housing 102. In an exemplary embodiment, the housing 200 is rotatably positionable on the fixture housing 102 by lifting upward on the housing 200 and the housing retainer 230 to compress the spring element 220 to disengage the housing 200 from the fixture housing 102. The housing 200 may then be rotated to a new position and released at the new position. The spring element 220 forces the housing 200 and the housing retainer 230 downward into engagement with the fixture housing 102 again to hold the new rotational position of the housing 200 relative to the fixture housing 102. As such, the angular orientation of the housing 200 may be changed relative to the fixture housing 102, such as to orient a North indicator 208 of the housing 200 at a true North direction. As such, when the sensor connector 112 is coupled to the receptacle connector 110, the photocell 160 may be aimed in the north direction.

The fixture housing 102 includes a top shell 180 having a mounting area 182 at which the receptacle connector 110 is mounted. In the illustrated embodiment, the fixture housing 102 includes a hub 184 in the mounting area 182. The hub 184 includes a flat upper wall 186 having an opening 188 therethrough. The upper wall 186 has an exterior surface 190 and an interior surface 192. The interior surface 192 faces the interior of the light fixture 104. The exterior surface 190 faces the exterior environment. The hub 184 includes a circumferential channel 194 along the upper wall 186 that receives the gasket 210.

In an exemplary embodiment, the fixture housing 102 includes locating features 196 extending from the exterior surface 190 of the upper wall 186 to distal ends. In the illustrated embodiment, the locating features 196 are locating posts. The locating features 196 may be cylindrical. Any number of the locating features 196 may be provided.

In the illustrated embodiment, the light fixture 104 includes a pair of locating features 196 diametrically opposed to each other on opposite sides of the opening 188. The locating features 196 may be used to locate the gasket 210. In an exemplary embodiment, the housing 200 engages the locating features 196 to locate the housing 200 relative to the fixture housing 102. The locating features 196 may hold a rotational position of the housing 200 relative to the light fixture 104 when the housing 200 engages the locating features 196. In an exemplary embodiment, the housing 200 may be lifted upward to clear the locating features 196 to allow the housing 200 to be rotated to a different rotational position and then released to reengage the locating features 196 to hold the housing 200 at the new rotational position.

In an exemplary embodiment, the fixture housing 102 includes interior locating features 198 extending from the interior surface 192 of the upper wall 186. The interior locating features 198 may be used to locate the spring element 220 relative to the fixture housing 102. The interior locating features 198 may be used to locate the housing retainer 230 relative to the fixture housing 102.

Figure 5:
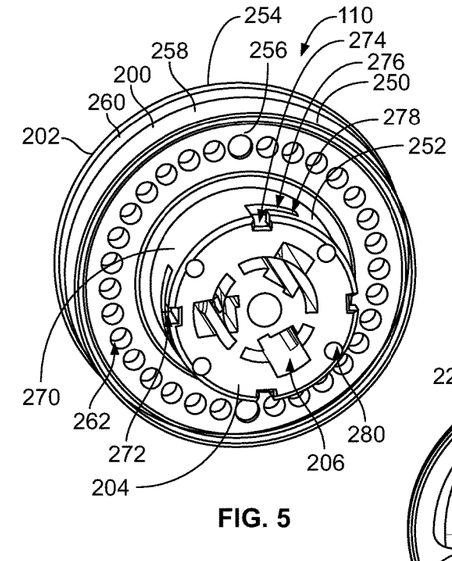
FIG. 5 is a bottom perspective view of a housing of the receptacle connector in accordance with an exemplary embodiment.

With additional reference to FIG. 5, FIG. 5 is a bottom perspective view of the housing 200 in accordance with an exemplary embodiment. The housing 200 includes a flange 250 at the top 202 and a base 252 at the bottom 204. The flange 250 has a larger diameter than the base 252. The base 252 is configured to extend through the opening 188 in the fixture housing 102. The flange 250 is located exterior of the fixture housing 102 and the base 252 is located interior of the fixture housing 102.

The flange 250 includes an upper surface 254, a lower surface 256 and a side wall 258 therebetween. The flange 250 includes a lip 260 along the side wall 258. The lip 260 provides a handgrip for lifting the housing 200 upward during rotational positioning of the housing 200 on the fixture housing 102. The lower surface 256 is configured to face the gasket 210. In an exemplary embodiment, the lower surface 256 includes a plurality of locating features 262 configured to interact with the locating features 196 of the fixture housing 102 for rotational positioning of the housing 200 relative to the fixture housing 102. In the illustrated embodiment, the locating features 262 are locating post holes formed in the lower surface 256 configured to receive the locating posts defining the locating features 196. The locating features 262 extend circumferentially around the flange 250. The locating features 262 are incrementally positioned around the flange 250 to orient the housing 200 in a plurality of different incremental positions relative to the fixture housing 102. In the illustrated embodiment, the locating features 262 are positioned at approximately 11.25° increments. In the illustrated embodiment, thirty-two locating features 262 are provided, thus defining thirty-two different angular orientations of the housing 200 relative to the fixture housing 102. Greater or fewer locating features 262 may be provided in alternative embodiments. Other types of locating features other than post holes may be used in alternative embodiments.

The base 252 extends from the lower surface 256 of the flange 250 to the bottom 204. In the illustrated embodiment, the base 252 is cylindrical. The base 252 includes a sidewall 270. In an exemplary embodiment, the base includes retention features 272 configured to interact with the housing retainer 230 to secure the housing retainer 230 to the housing 200. In the illustrated embodiment, the retention features 272 are slots or tracks formed in the base 252 that receive corresponding retention features of the housing retainer 230. In the illustrated embodiment, each retention feature 272 is an L-shaped track defining a bayonet connection. The L-shaped track includes a vertical section 274 and a horizontal section 276 having a serif 278 configured to receive the corresponding retention feature of the housing retainer 230 to lock the housing retainer 230 to the housing 200. Other types of retention features 272 may be provided in alternative embodiments.

The contact channels 206 extend through the housing 200. For example, the contact channels 206 extend through the flange 250 and the base 252. The contact channels 206 may be open at the top 202 to receive the contacts 116 of the sensor connector 112. The contact channels 206 may be open at the bottom 204, such as for loading the contacts 114 into the contact channels 206 and/or for receiving the wires 130. In an exemplary embodiment, the housing 200 includes wire channels 280 that receive the wires 132. The wires 130, 130 to extend from the housing 200 and are routed away from the receptacle connector 110 to other components within the light fixture 104.

Figure 6:
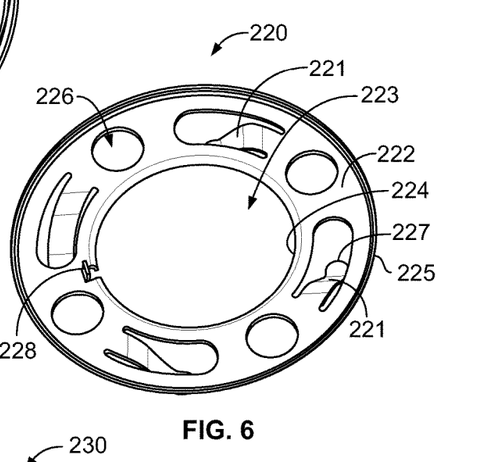
FIG. 6 is a bottom perspective view of a spring element of the receptacle connector in accordance with an exemplary embodiment.

FIG. 6 is a bottom perspective view of the spring element 220 in accordance with an exemplary embodiment. The spring element 220 includes a main body and one or more spring fingers 221 extending from the main body. In the illustrated embodiment, the main body is a ring 222 extending around an opening 223. The opening 223 is configured to receive the base 252 of the housing 200 (shown in FIG. 5). The ring 222 includes an inner edge 224 defining the opening 223 and an outer edge 225.

In an exemplary embodiment, the spring element 220 includes one or more locating features 226 configured to engage the interior locating features 198 (shown in FIG. 4) of the fixture housing 102 to locate the spring element 220 relative to the fixture housing 102. In the illustrated embodiment, the locating features 226 are openings in the ring 222. Other types of locating features may be used in alternative embodiments, such as tabs, posts, slots and the like.

In an exemplary embodiment, the spring element 220 is a stamped and formed part. The spring fingers 221 are stamped from the ring 222 and extend to distal ends 227. In an exemplary embodiment, the spring fingers 221 are bent upward such that the ring 222 is located below the distal ends 227 of the spring fingers 221. The distal ends 227 of the spring fingers 221 are configured to engage the fixture housing 102 to hold the ring 222 spaced apart from the fixture housing 102. The spring fingers 221 are deflectable and may be compressed during use.

In an exemplary embodiment, the spring element 220 includes a rotation stop 228 used to stop or limit rotation of the housing 200 relative to the spring element 220. In the illustrated embodiment, the rotation stop 228 extends downward from the ring 222. The rotation stop 228 may be stamped and formed from the ring 222.

Figure 7:
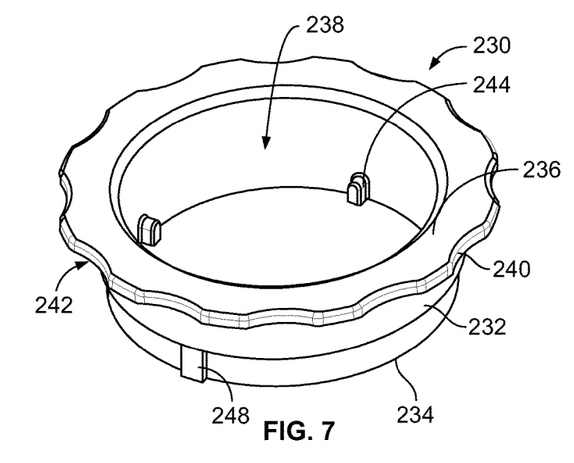
FIG. 7 is a bottom perspective view of a housing retainer of the receptacle connector in accordance with an exemplary embodiment.

FIG. 7 is a bottom perspective view of the housing retainer 230 in accordance with an exemplary embodiment. The housing retainer 230 includes a body 232 extending between a top 234 and a bottom 236. In the illustrated embodiment, the body 232 is cylindrical and includes an opening 238 therethrough between the top 234 and the bottom 236.

The housing retainer 230 includes a flange 240 at the bottom 236. The flange 240 includes depressions 242 along the outer edge of the flange 240. The depressions define finger grips for rotation of the housing retainer 230 relative to the housing 200.

In an exemplary embodiment, the housing retainer 230 includes one or more retention features 244 extending into the opening 238 from the body 232. The retention features 244 are configured to interact with the retention features 272 (shown in FIG. 5) of the housing 200 to couple the housing retainer 230 to the housing 200. In the illustrated embodiment, the retention features 244 are posts extending into the opening 238. The posts are configured to be received in the L-shaped tracks of the housing 200. In the illustrated embodiment, the retention features 244 are provided at or near the top 234; however, the retention features 244 may be located at other locations in alternative embodiments.

In an exemplary embodiment, the housing retainer 230 includes a rotation stop 248 used to stop or limit rotation of the housing 200 relative to the spring element 220 (FIG. 6). In the illustrated embodiment, the rotation stop 248 is formed on the exterior of the body 232 and is located at the top 234. The rotation stop 248 is configured to engage the rotation stop 228 of the spring element 220 to limit rotation of the housing retainer 230 relative to the spring element 220 to less than 360°.

Figure 8:
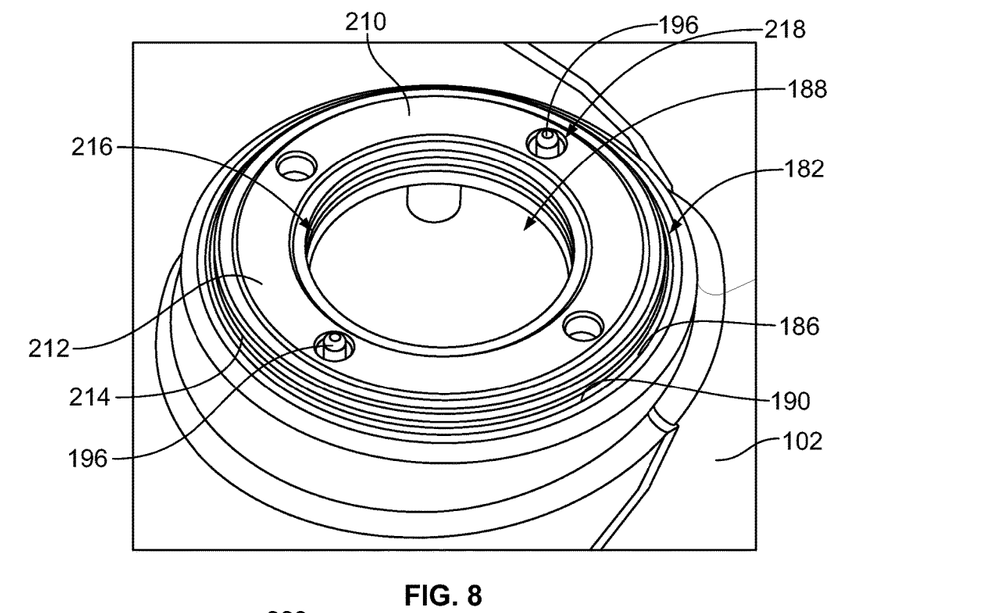
FIG. 8 illustrates a portion of the receptacle connector mounted to a fixture housing.

FIG. 8 illustrates a portion of the receptacle connector 110 mounted to the fixture housing 102. FIG. 8 shows the gasket 210 coupled to the fixture housing 102 at the mounting area 182. The gasket 210 includes an upper surface 212 and a lower surface 214. The lower surface 214 engages and seals against the exterior surface 190 of the fixture housing 102. In an exemplary embodiment, the gasket 210 includes an opening 216 that is aligned with the opening 188 in the upper wall 186. The opening 216 receives the base 252 of the housing 200 (shown in FIG. 5). In an exemplary embodiment, the gasket 210 includes post holes 218 that receive the locating features 196. The locating features 196 pass through the post holes 218 above the upper surface 212 for interfacing with the housing 200 when mounted to the fixture housing 102. The locating features 196 stop rotation of the gasket 210 relative to the fixture housing 102. The upper surface 212 of the gasket 210 is oriented for sealing engagement with the housing 200.

Figure 9:
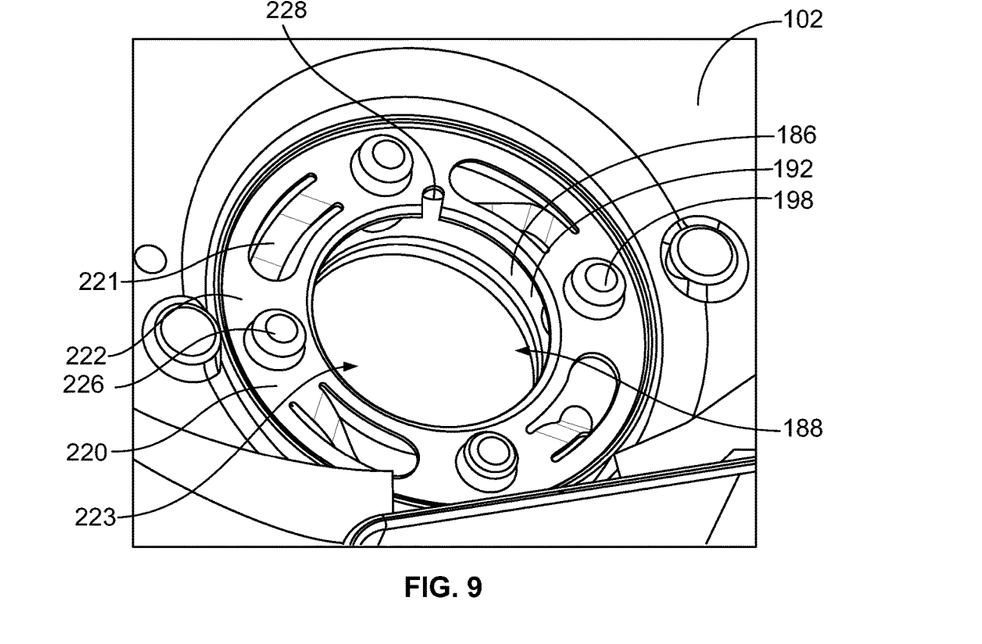
FIG. 9 is a bottom perspective view of a portion of the receptacle connector mounted to the fixture housing.

FIG. 9 is a bottom perspective view of a portion of the receptacle connector 110 mounted to the fixture housing 102. FIG. 9 shows the spring element 220 coupled to the fixture housing 102. The opening 223 in the spring element 220 is aligned with the opening 188 and the fixture housing 102 to receive the base 252 of the housing 200 (shown in FIG. 5). The ring 222 receives the interior locating features 198 in the locating features 226. The interior locating features 198 position the spring element 220 relative to the fixture housing 102. The interior locating features 198 resist rotation of the spring element 220 relative to the fixture housing 102. The spring element 220 is coupled to the fixture housing 102 such that the spring fingers 221 engage the interior surface 192 of the upper wall 186 of the fixture housing 102. The spring fingers 221 hold the ring 222 spaced apart from the interior surface 192. The spring fingers 221 are deflectable to allow the ring 222 to move toward the interior surface 192 during use. The rotation stop 228 extends from the ring 222 and is configured to engage the housing retainer 230 (shown in FIG. 7).

Figure 10:
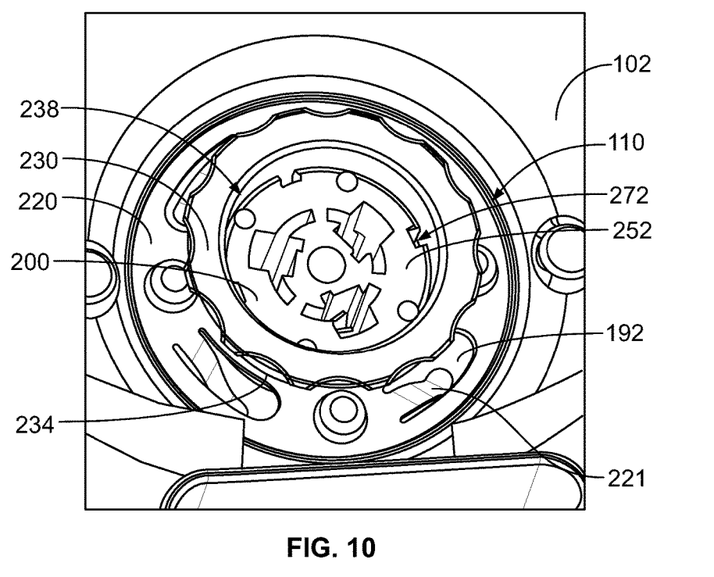
FIG. 10 is a bottom perspective view of a portion of the receptacle connector mounted to the fixture housing.

FIG. 10 is a bottom perspective view of a portion of the receptacle connector 110 mounted to the fixture housing 102. FIG. 10 shows the housing retainer 230 coupled to the housing 200. During assembly, the base 252 of the housing 200 is loaded through the opening 188 in the fixture housing 102 to the interior of the fixture housing 102. The housing retainer 230 is coupled to the base 252 from the interior. The base 252 is loaded into the opening 238 in the housing retainer 230. The retention features 244 (shown in FIG. 7) are received in the retention features 272. The housing retainer 230 may be rotatably coupled to the housing 200. For example, the retention features 244 interface with the retention features 272 with a bayonet style connection. Other types of connections may be utilized in alternative embodiments to secure the housing retainer 230 to the base 252 of the housing 200.

The spring element 220 is located between the interior surface 192 of the fixture housing 102 and the housing retainer 230. For example, the top 234 of the housing retainer 230 engages the lower surface of the ring 222. The spring fingers 221 may be partially compressed by the housing retainer 230 in the normal position. The spring fingers 221 provide a biasing force on the housing retainer 230 to hold the retention features 244 in the serifs 278 of the retention features 272. The spring fingers 221 provide a downward biasing force on the housing retainer 230 that is transferred to the housing 200. The downward biasing force compresses the housing 200 against the gasket 210 at the exterior of the fixture housing 102.

Figure 11:
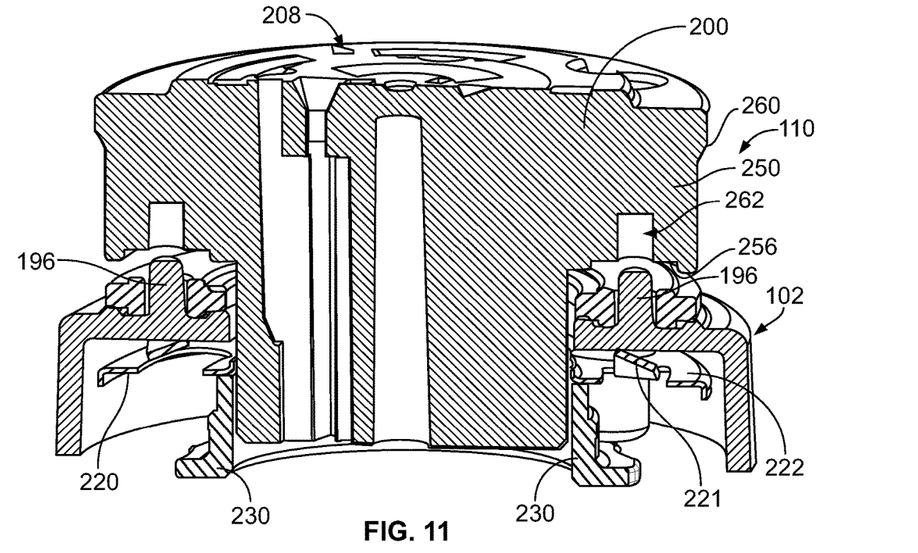
FIG. 11 is a cross-sectional view of the receptacle connector mounted to the fixture housing.

FIG. 11 is a cross-sectional view of the receptacle connector 110 mounted to the fixture housing 102 showing the housing 200 in a lifted or clearance position. To change the rotational position of the housing 200 relative to the fixture housing 102, the housing 200 is lifted upward. For example, the installer may lift upward on the lip 260 to clear the locating features 196 of the fixture housing 102. As the housing 200 is lifted upward, the housing retainer 230, which is coupled to the housing 200, is likewise lifted upward against the ring 222 of the spring element 220. The upward movement of the housing retainer 230 and the spring element 220 compresses the spring fingers 221, which spring loads the spring element 220 against the housing retainer 230.

In the clearance position, the lower surface 256 of the flange 250 is located above the distal ends of the locating features 196. The locating features 196 are unable to stop rotation of the housing 200 in the clearance position. The housing 200 is free to rotate within an approximately 360° arc (defined by the rotation stop features) to a different rotational position, such as to align the North indicator 208 with true North.

Once the housing 200 has been properly positioned at the new location, the housing 200 may be released. The spring element 220 forces the housing retainer 230, and thus the housing 200 downward to an engaged position (FIG. 4). In the engaged position, the locating features 262 of the housing 200 receive the locating features 196 of the fixture housing 102. When the locating features 196 are received in the locating features 262, the rotational position of the housing 200 is maintained. The locating features 196 do not allow rotation of the housing 200 relative to the fixture housing 102 until the housing 200 is again moved to the clearance position.

Figure 12:
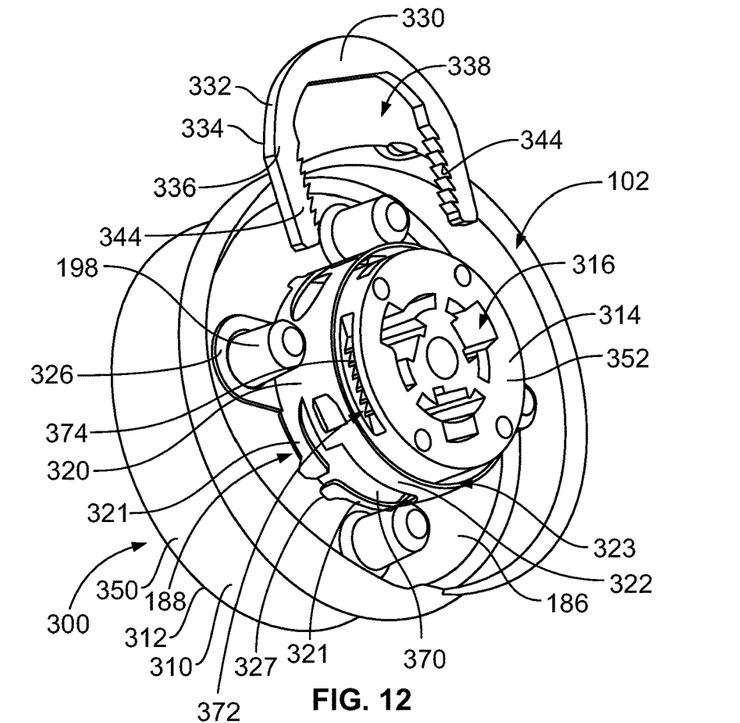
FIG. 12 is a bottom perspective view of a receptacle connector in accordance with an exemplary embodiment.
Figure 13:
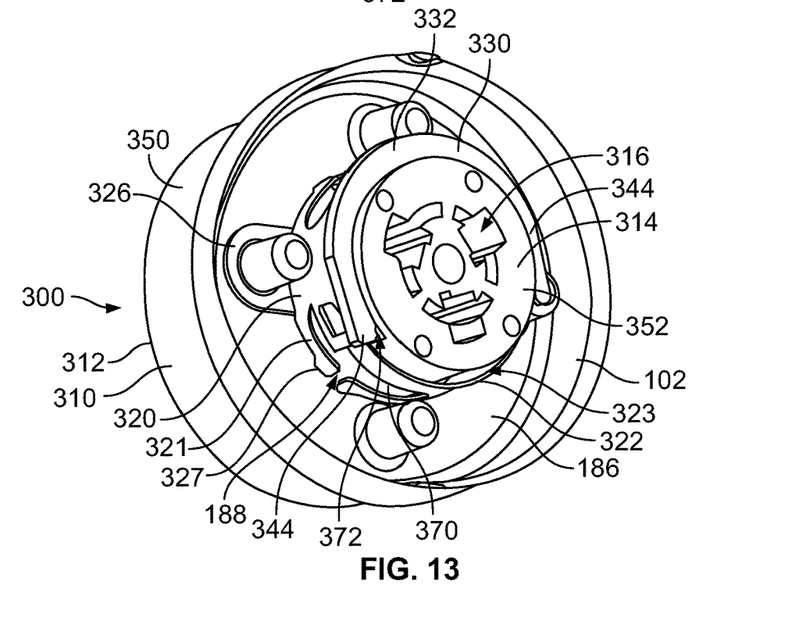
FIG. 13 is a bottom perspective view of the receptacle connector shown in FIG. 12 in accordance with an exemplary embodiment.

FIG. 12 is a bottom perspective view of a receptacle connector 300 in accordance with an exemplary embodiment. FIG. 13 is a bottom perspective view of the receptacle connector 300 in accordance with an exemplary embodiment. FIGS. 12 and 13 illustrate the receptacle connector 300 mounted to the fixture housing 102. FIG. 12 illustrates the receptacle connector 300 partially assembled. FIG. 13 illustrates the receptacle assembly 300 fully assembled. The receptacle connector 300 is similar to the receptacle connector 110; however, the receptacle connector 300 includes different mounting components for mounting the receptacle connector 300 to the fixture housing 102. The sensor connector 112 (shown in FIG. 1) is configured to be coupled to the receptacle connector 300.

The receptacle connector 110 includes a housing 310 extending between a top 312 and a bottom 314 opposite the top 312. The housing 310 is configured to be secured to the fixture housing 102, with the gasket 210 (shown in FIG. 3) therebetween. The housing 310 holds the power contacts 114 (FIG. 2) in contact channels 316 of the housing 310.

The receptacle connector 110 includes a spring element 320 and a housing retainer 330 coupled to the housing 310. The housing retainer 330 is configured to be coupled to the bottom 314 of the housing 310. The housing retainer 330 engages the spring element 320 and the spring element 320 is used to hold the housing 310 in sealing engagement against the gasket 210. In an exemplary embodiment, the housing 310 is rotatably positionable on the fixture housing 102 by lifting upward on the housing 310 and the housing retainer 330 to compress the spring element 320 to disengage the housing 310 from the fixture housing 102. The housing 310 may then be rotated to a new position and released at the new position. The spring element 320 forces the housing 310 and the housing retainer 330 downward into engagement with the fixture housing 102 again to hold the new rotational position of the housing 310 relative to the fixture housing 102. As such, the angular orientation of the housing 310 may be changed relative to the fixture housing 102, such as to orient a North indicator of the housing 310 at a true North direction.

The housing 310 includes a flange 350 at the top 312 and a base 352 at the bottom 314. The base 352 is configured to extend through the opening 188 in the fixture housing 102 to the interior of the fixture housing 102. In an exemplary embodiment, the flange 350 of the housing 310 may include locating features similar to the locating features 262 (shown in FIG. 5) for engaging the locating features 196 of the fixture housing 102.

The base 352 includes a sidewall 370. In an exemplary embodiment, the base includes retention features 372 configured to interact with the housing retainer 330 to secure the housing retainer 330 to the housing 310. In the illustrated embodiment, the retention features 372 are a ratchet including a rack of teeth 374. The ratchet is configured to receive the corresponding retention feature of the housing retainer 330 to lock the housing retainer 330 to the housing 310. Other types of retention features 372 may be provided in alternative embodiments.

The spring element 320 includes a main body and one or more spring fingers 321 extending from the main body. In the illustrated embodiment, the main body is a sleeve 322 extending around an opening 323. The opening 323 is configured to receive the base 352 of the housing 310. The spring element 320 includes one or more locating features 326 configured to engage the interior locating features 198 of the fixture housing 102 to locate the spring element 320 relative to the fixture housing 102. In an exemplary embodiment, the spring element 320 is a stamped and formed part. The spring fingers 321 are stamped from the sleeve 322 and extend to distal ends 327. The distal ends 327 of the spring fingers 321 engage the fixture housing 102. The spring fingers 321 are deflectable and may be compressed during use. The spring element 320 is coupled to the fixture housing 102 such that the spring fingers 321 engage the interior surface 192 of the upper wall 186 of the fixture housing 102. The spring fingers 321 hold the sleeve 322 spaced apart from the interior surface 192. The spring fingers 321 are deflectable to allow the sleeve 322 to move toward the interior surface 192 during use.

The housing retainer 330 includes a body 332 extending between a top 334 and a bottom 336. In the illustrated embodiment, the body 332 is a C-clip having an opening 338 that receives the base 352 of the housing 310. The housing retainer 330 includes retention features 344 configured to interact with the retention features 372 of the housing 310 to couple the housing retainer 330 to the housing 310. In the illustrated embodiment, the retention features 344 are pawls having teeth 374 that engage the teeth 374.

During assembly, the base 352 of the housing 310 is loaded through the opening 188 in the fixture housing 102 to the interior of the fixture housing 102 and loaded through the opening 323 in the spring element 320. The housing retainer 330 is coupled to the base 352 from the interior. The retention features 344 engage the retention features 372. The spring element 320 is located between the interior surface 192 of the fixture housing 102 and the housing retainer 330.

For example, the top 334 of the housing retainer 330 engages the lower surface of the sleeve 322. The spring fingers 321 may be partially compressed by the housing retainer 330 in the normal position. The spring fingers 321 provide a biasing force on the housing retainer 330 to hold the housing 310 against the gasket 210. The downward biasing force compresses the housing 310 against the gasket 210 at the exterior of the fixture housing 102.

To change the rotational position of the housing 310 relative to the fixture housing 102, the housing 310 is lifted upward. As the housing 310 is lifted upward, the housing retainer 330, which is coupled to the housing 310, is likewise lifted upward against the sleeve 322 of the spring element 320. The upward movement of the housing retainer 330 and the spring element 320 compresses the spring fingers 321, which spring loads the spring element 320 against the housing retainer 330. In the clearance position, the housing 310 is free to rotate within an approximately 360° arc (defined by the rotation stop features) to a different rotational position. Once the housing 310 has been properly positioned at the new location, the housing 310 may be released. The spring element 320 forces the housing retainer 330, and thus the housing 310 downward to an engaged position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A light sensor assembly comprising:
    a receptacle connector configured to be mounted to a light fixture and configured to receive a sensor connector having a photocontrol component, the receptacle connector comprising:
    a housing having a top and a bottom, the top defining a mating interface configured to be mated to the sensor connector, the housing having contact channels receiving contacts, the housing having a base at the bottom configured to extend through a fixture housing of the light fixture such that the top is accessible at an exterior of the fixture housing and the bottom is accessible at an interior of the fixture housing, the base having a retention feature, the housing having location features configured to engage a locating feature of the light fixture to hold a rotational position of the housing relative to the light fixture;
    a spring element having an opening receiving the base of the housing and positionable on the interior of the fixture housing, the spring element having a spring finger configured to engage the fixture housing; and
    a housing retainer separate and discrete from the housing, the housing retainer being coupled to the base from the interior of the fixture housing and being positionable on the interior of the fixture housing, the housing retainer having a retention feature separably engaging the retention feature of the housing to secure the housing retainer to the housing, the housing retainer engaging the spring element;
    wherein the housing is rotatably positionable on the light fixture by lifting upward on the housing and the housing retainer to compress the spring element to disengage the locating features of the housing from the locating feature of the light fixture and rotating the housing to a new position, wherein the housing is released at the new position and forced downward by the spring finger to engage a corresponding locating feature of the housing with the locating feature of the light fixture to again hold the rotational position of the housing relative to the light fixture.

2. The light sensor assembly of claim 1, wherein the housing is configured to be lifted upward relative to the fixture housing to clear the locating features of the housing above the locating features of the light fixture to allow rotation of the housing to the new position.

3. The light sensor assembly of claim 1, wherein the housing retainer includes a cylindrical body having an opening receiving the base of the housing, the body having an upper lip engaging the spring element.

4. The light sensor assembly of claim 1, wherein the housing retainer includes a cylindrical body having an opening receiving the base of the housing, the housing retainer including a flange at a bottom of the base.

5. The light sensor assembly of claim 4, wherein the flange includes at least one depression defining a finger grip for rotation of the housing retainer relative to the housing.

6. The light sensor assembly of claim 4, wherein the flange is configured to engage the light fixture to limit upward lifting of the housing and the housing retainer during rotational positioning of the housing on the light fixture.

7. The light sensor assembly of claim 1, wherein the housing retainer includes a rotation stop, the spring element including a rotation stop, the rotation stop of the housing retainer configured to engage the rotation stop of the spring element to limit rotation of the housing and the housing retainer to less than 360°.

8. The light sensor assembly of claim 1, wherein the housing retainer is rotatably coupled to the housing.

9. The light sensor assembly of claim 1, wherein the retention feature of the housing includes an L-shaped track having a serif, the retention feature of the housing retainer including a pin received in the L-shaped track being held in the serif by the spring element.

10. The light sensor assembly of claim 1, wherein the housing retainer is removably coupled to the housing.

11. The light sensor assembly of claim 1, wherein the retention features allow for tool-less coupling of the housing retainer to the housing.

12. The light sensor assembly of claim 1, wherein the housing comprises a through bore configured to receive a fastener to secure the housing to the fixture housing as a secondary securing feature of the housing.

13. The light sensor assembly of claim 1, wherein the housing includes a rim at the top having an increased diameter defining a finger grip to lift the housing upward.

14. The light sensor assembly of claim 1, further comprising a gasket configured to be positioned between the housing and the fixture housing.

15. The light sensor assembly of claim 1, wherein the spring element includes a locating feature configured to engage the fixture housing to rotatably secure the spring element to the fixture housing, the housing and the housing retainer being rotatable relative to the spring element.

16. The light sensor assembly of claim 1, wherein the spring finger is one of a plurality of spring fingers of the spring element.

17. The light sensor assembly of claim 1, wherein the housing retainer is a C-clip coupled to the base of the housing.

18. A light sensor assembly comprising:
a receptacle connector configured to be mounted to a light fixture and configured to receive a sensor connector having a photocontrol component, the receptacle connector comprising:
a housing having a top and a bottom with a base at the bottom and a flange at the top extending from the base, the top defining a mating interface configured to be mated to the sensor connector, the housing having arcuate shaped contact channels receiving twist lock power contacts open at the top for twist lock mating with twist lock power contacts of the sensor connector, the base being configured to extend through a fixture housing of the light fixture such that a foot of the flange is able to rest on an exterior of the fixture housing and the bottom is accessible at an interior of the fixture housing, the base having a retention feature, the flange having locating features incrementally positioned circumferentially around the foot of the flange configured to engage a locating feature of the light fixture to hold a rotational position of the housing relative to the light fixture;
a spring element having an opening receiving the base of the housing and positionable on the interior of the fixture housing, the spring element having a spring finger configured to engage the fixture housing; and
a housing retainer separate and discrete from the housing, the housing retainer being coupled to the base from the interior of the fixture housing and being positionable on the interior of the fixture housing, the housing retainer having a retention feature separably engaging the retention feature of the housing to secure the housing retainer to the housing, the housing retainer engaging the spring element;
wherein the housing is rotatably positionable on the light fixture by lifting upward on the housing and the housing retainer to compress the spring element to disengage the locating features of the housing from the locating feature of the light fixture and rotating the housing to a new position, wherein the housing is released at the new position and forced downward by the spring finger to engage a corresponding locating feature of the housing with the locating feature of the light fixture to again hold the rotational position of the housing relative to the light fixture.

19. The light sensor assembly of claim 18, wherein the housing is configured to be lifted upward relative to the fixture housing to clear the locating features of the housing above the locating features of the light fixture to allow rotation of the housing to the new position.

20. A light sensor assembly comprising:
a receptacle connector configured to be mounted to a light fixture and configured to receive sensor connector having a photocontrol component, the receptacle connector comprising:
a housing having a top and a bottom with a base at the bottom and a flange at the top extending from the base, the top defining a mating interface configured to be mated to the sensor connector, the housing having contact channels receiving power contacts, the base being configured to extend through a fixture housing of the light fixture such that a foot of the flange is able to rest on an exterior of the fixture housing and the bottom is accessible at an interior of the fixture housing, the base having a retention feature, the flange having locating features incrementally positioned circumferentially around the foot of the flange configured to engage a locating feature of the light fixture to hold a rotational position of the housing relative to the light fixture;
a spring element including a ring having an upper surface and a lower surface, the ring having an opening through the ring, the opening receiving the base of the housing, the ring being positionable on the interior of the fixture housing with the upper surface facing the fixture housing, the spring element having a spring finger extending upward from the ring to engage the fixture housing and hold the ring spaced apart from the fixture housing; and
a housing retainer separate and discrete from the housing, the housing retainer being coupled to the base from the interior of the fixture housing and being positionable on the interior of the fixture housing, the housing retainer having a cylindrical body having an opening receiving the base of the housing, the body of the housing retainer having an upper lip engaging the lower surface of the ring of the spring element, the housing retainer having a retention feature separably engaging the retention feature of the housing to secure the housing retainer to the housing;
wherein the housing is rotatably positionable on the light fixture by lifting upward on the flange of the housing to compress the spring element between the fixture housing and the housing retainer to clear the locating features of the housing above the locating feature of the light fixture and rotating the housing to a new position, wherein the housing is released at the new position and forced downward by the spring finger to engage a corresponding locating feature of the housing with the locating feature of the light fixture to again hold the rotational position of the housing relative to the light fixture.

* * * * *